Nov. 1, 1960   L. G. BOEHNER ET AL   2,958,385
MOTOR COMPARTMENT VENTILATOR ESPECIALLY FOR
MOTOR VEHICLES HAVING REAR MOUNTED MOTORS
Filed July 11, 1955
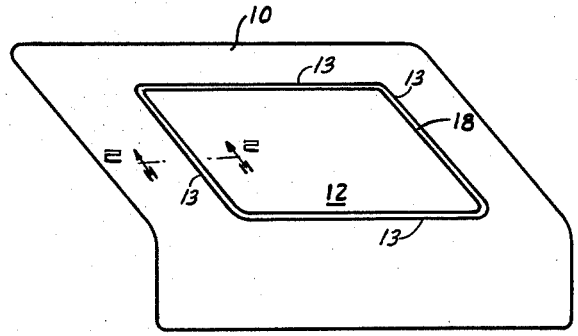
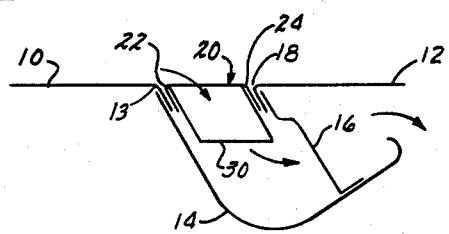
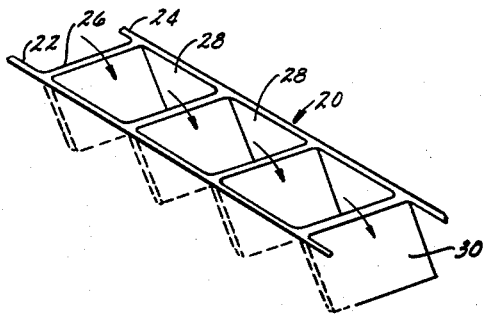
INVENTOR.
LUDWIG G. BOEHNER
EGON MÖLLER
BY
SMITH, OLSEN & KOTTS
ATTORNEYS United States Patent Office 2,958,385
Patented Nov. 1, 1960

2,958,385

MOTOR COMPARTMENT VENTILATOR ESPECIALLY FOR MOTOR VEHICLES HAVING REAR MOUNTED MOTORS

Ludwig G. Boehner and Egon Möller, Braunschweig, Germany, assignors to Volkswagenwerk G.m.b.H., Wolfsburg, Germany, a corporation of Germany Filed July 11, 1955, Ser. No. 520,959

Claims priority, application Germany July 9, 1954

3 Claims. (Cl. 180—54)

The present invention relates to a motor compartment ventilator especially for motor vehicles having rear mounted motors. More particularly, the present invention relates to ventilator means whereby air for cooling and operating the motor is introduced into the motor compartment.

Prior to the present invention, ventilators have been utilized which provide air openings in the form of groups of slits, extended pipes, or set-in grids made of sheet metal or castings. Such devices in general are often not satisfactory from the standpoint of looks and in particular, the sheet metal or cast set-in grids require additional reinforcing members. In addition, such prior devices have required additional casing structure to entrap and carry off water which enters also through the ventilator. The additional casing structure adds to the weight and expense of the ventilator, and further, such additional casings have interfered with and diverted much of the entrant air.

In contrast to these prior devices, the present invention provides an air entrant slot and a water channel associated therewith whereby the trapping of water which may enter with the air is greatly facilitated. The water channel serves also as reinforcement for the ventilator structure, and the ventilator structure produces a minimum of interference with entrant air passing therethrough and detracts very slightly from the appearance of the cover of the motor compartment.

The ventilator of the present invention provides, in a novel way, an air entrant slot through the outer wall of the motor compartment in a manner which does not interfere with the contour of the outer wall. This is achieved by cutting a panel from the outer wall, and thereafter replacing the cut-out panel in the opening after it has been reduced in dimension by the width of the desired air entrant slot. Below the slot there is positioned a water channel which is open to one side and which is affixed to the outer wall and the cut-out panel or to both to serve as a reinforcement for the edges defining the slot.

Advantageously, the air entrant slot may be provided around doors or flaps such as the lid of the motor compartment. The slot may be completely around the edge of such doors or only in portions thereof. The ventilator slot may also be covered with a suitable decorative grid to which may be attached inwardly projecting vanes to direct the flow of air. The amount of air entering through the ventilator is determined by the size of the air entrant slot and by the side opening in the water channel.

The accompanying drawing illustrates one embodiment of the present invention.

In the drawing:

Fig. 1 is a perspective view of the outer wall of a motor compartment having a ventilator structure embodying the present invention provided therein, Fig. 2 is a sectional view taken on the line 2—2 of Fig. 1 in the direction of the arrows, and Fig. 3 is a perspective view of the decorative grid of the ventilator structure of Fig. 2.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to Figs. 1 and 2 of the drawing, to form the ventilator structure embodying the present invention, the outer wall 10 of the motor compartment is provided with the cut-out panel 12. As can be seen in Fig. 2, the edges 13 surrounding the opening in the wall 10 in which the panel 12 is positioned are then bent inwardly to provide means for attaching thereto a water catching and carry-off channel 14. The water channel 14 is formed of a strip of sheet metal and is attached along one edge to the downturned portion of wall 10 whereas the other edge thereof is spaced below panel 12 to provide an air passage. The cut-out panel 12 also has its edges turned inwardly and is reassembled in wall 10 by means of a plurality of straps or posts 16 affixed to the water channel 14. Thus, the contour of the outer wall 10 has been restored, and an air entrant slot 18 has been provided between the edges of the panel 12 and the opening cut in wall 10. The water channel 14 serves to trap any water which may enter with the air entering through the slot 18 and carries the water off through suitable drain connections (not shown) which would be readily apparent to one skilled in the art and which are conventional so as not to constitute a part of the present invention. The water channel also serves as reinforcement for the wall 10. The panel 12 may be permanently affixed to the posts 16 or may be only in tight engagement therewith so that the panel is removable, such for example as would be desired if the panel 12 is to be utilized as an access door to the motor compartment.

Referring now to Fig. 3 of the drawing, there is illustrated a decorative grid 20 which in Fig. 2 is shown in position within air entrant slot 18 in Fig. 2. The decorative grid 20 is provided with side stringer members 22 and 24 and a series of crossbars 26 defining the openings 28. Extending inwardly from the crossbars 26 are vanes 30 which are bent to direct the air passing through the openings 30 in the desired direction. The grid 20 is a close fit in the air entrant slot 18 and may be affixed permanently therein if desired by securing the side stringer 22 to the downturned portion of wall 10 by any suitable manner.

Referring now to Fig. 2 of the drawing, the operation of the ventilator structure embodying the present invention may be described. Air enters the openings 28 in the grid 20 and is directed by the vanes 30 toward the water channel 14. The water channel 14 turns the air in the direction of the arrows so that it passes through the space between the free edge of channel 14 and panel 12 into the motor compartment. As the air turns, it drops any water it may be carrying into the channel 14. The channel 14 also serves to carry off any water which may run off the outer surface of the wall 10 into the openings 28. If desired, the decorative grid 20 may be omitted without departing from the spirit of the present invention.

Having thus described our invention, we claim:

1. An outer wall for an automobile motor compartment, said outer wall having an opening therein and a panel positioned in said opening in conformity with the contour of said wall; said panel being smaller than said opening to define an air entrant slot between the periphery of said panel and the adjacent opening defining edges of said outer wall; a channel member disposed below said air entrant slot and affixed along one longitudinal edge thereof to said outer wall, the other longitudinal edge of said channel member being spaced below said panel; and means carried by said channel member to support said panel.

2. The structure as claimed in claim 1 and further characterized in that a decorative grid is positioned in said air entrant slot.

3. The structure as claimed in claim 2 and further characterized in that said grid is provided with inwardly extending vanes to direct the flow of air therethrough.

References Cited in the file of this patent

UNITED STATES PATENTS

| | | |
|---|---|---|
| 1,722,590 | Miller | July 30, 1929 |
| 1,823,191 | Cronwall | Sept. 15, 1931 |
| 2,100,490 | Rippingille | Nov. 30, 1937 |
| 2,670,055 | Dorman et al. | Feb. 23, 1954 |
| 2,707,320 | Fish | May 3, 1955 |
| 2,719,476 | Dovolis | Oct. 4, 1955 |

FOREIGN PATENTS

| | | |
|---|---|---|
| 860,040 | France | Sept. 20, 1940 |
| 1,094,259 | France | Dec. 1, 1954 |
| 70,018 | Germany | Sept. 25, 1915 |
| 587,555 | Germany | Nov. 4, 1933 |
| 220,898 | Switzerland | July 16, 1942 |

OTHER REFERENCES

Article: "Fleet Built Plastic Bodies Can Take It," pages 82, 83, 130, 131 of "Commercial Car Journal" issued February 1954.